June 27, 1967   G. A. LEWIS   3,327,759
GAS TURBINE ENGINE FUEL SYSTEMS
Filed Aug. 30, 1965   2 Sheets-Sheet 1

3,327,759
GAS TURBINE ENGINE FUEL SYSTEMS
Geoffrey Arthur Lewis, Olton, Solihull, England, assignor to Joseph Lucas (Industries) Limited, Birmingham, England
Filed Aug. 30, 1965, Ser. No. 483,421
4 Claims. (Cl. 158—36)

This invention relates to fuel systems for gas turbine engines and of the kind incorporating a pair of metering orifices through which fuel from a supply source must flow in series to the burner or burners, and wherein the size of each orifice is at least in part determined by the speed of the engine.

In such systems it has been usual to employ two centrifugally operable devices for applying the speed signal to movable parts of the two orifices respectively, and one of the devices has been sensitive to the density of the fuel whilst the other has been substantially insensitive to the density of the fuel.

The object of the present invention is to provide such a fuel system in an improved form.

According to the invention a fuel system of the kind specified comprises a single centrifugally operable device for controlling two movable parts associated with the two orifices respectively, and means for applying to one of said parts a force dependent on the density of the fuel whereby the size of one of the orifices will be dependent on fuel density whilst the size of the other will be substantially independent of fuel density.

Figure 1:
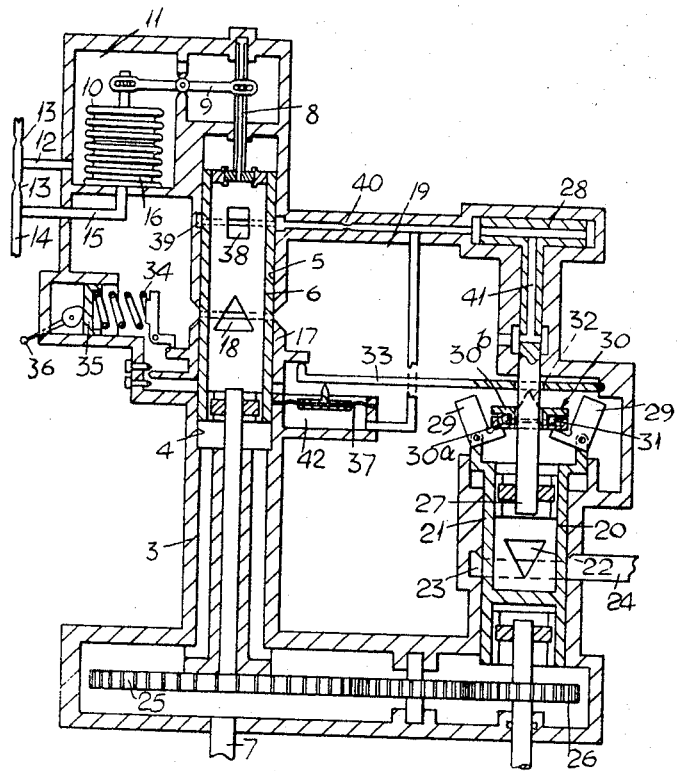
Figure 2:
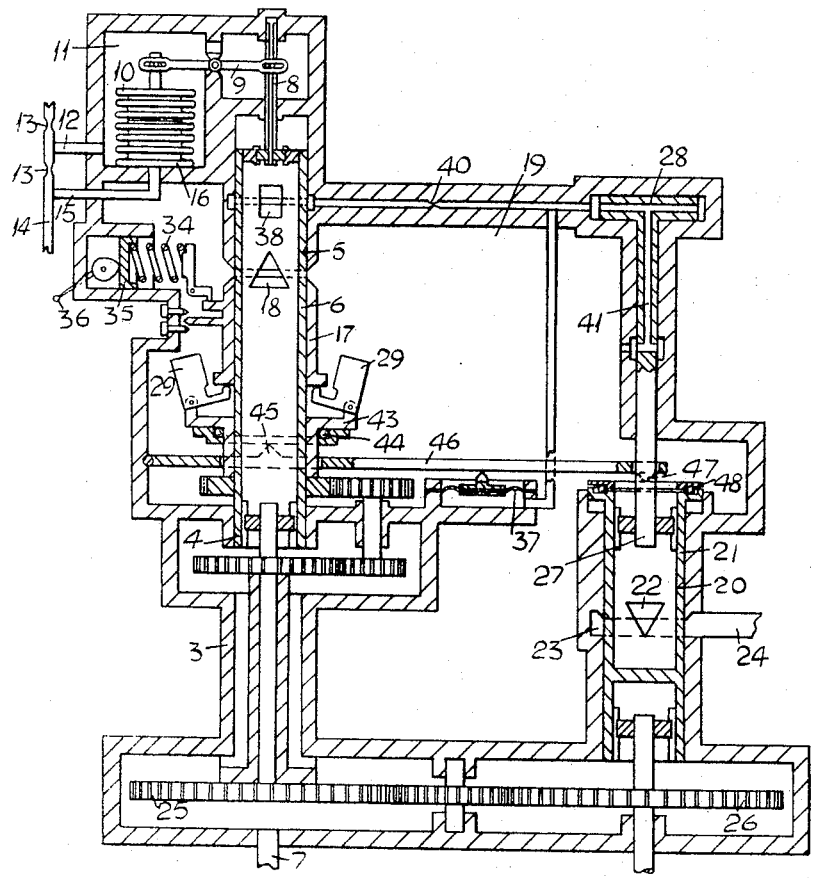

In the accompanying drawings FIGURE 1 is a diagrammatic sectional view of one example of the invention, and FIGURE 2 is a similar view of a modification.

Referring first to FIGURE 1 of the drawings there is provided a body part 3 in which are formed a pair of coaxial cylindrical bores 4, 5 in which opposite ends respectively of a tube 6 are axially slidable. The bore 4 is open at its remote end to an inlet 7 to which it is intended that fuel should be supplied by a pump. The bore 5 is closed at its remote end except for a central hole through which a rod 8 slidably extends. The rod 8 is connected to the tube 6 in a manner to permit relative rotation whilst preventing relative axial movement. The rod, and therefore the tube, is adapted to assume an axial position dependent on air pressure. For this purpose the rod 8 is pivotally connected to one arm of a lever 9, the other arm of which is pivotally connected to an evacuated bellows 10 situated in a cavity 11 in the body 3 subjected (through pipe 12) to the air pressure between a pair of restrictions 13 in a pipe 14 interconnecting the engine comressor outlet with the engine comressor inlet or some other relatively low pressure. The interior of a second bellows 16, which is connected to the evacuated bellows 10, is also subjected to the pressure in said pipe 14 through a further pipe 15.

A portion of the tube 6 exposed between the bores 4, 5 is surrounded by an axially movable sleeve 17. Moreover, in the wall of the tube 6 is formed a triangular aperture 18 which is arranged to be exposed between the bore 5 and the sleeve 17. Thus, the axial setting of the tube 6 in the bore 5 determines the circumferential width of the aperture 18 which is exposed, whilst the axial setting of the sleeve 17 determines the axial width of the aperture which is exposed.

Fuel supplied by the pump to the inlet 7 flows to the interior of the tube 6 and thence through the aperture 18 to the chamber 19 in the body part 3. Opening from the chamber 19 is a third cylindrical bore 20 in the body part extending parallel to the bores 4, 5. Moreover, in the bore 20 is a skirted piston 21 into the skirt of which fuel from the chamber 19 can flow. In the wall of the skirt of the piston 21 is a triangular aperature 22 through which fuel can flow to an annular groove 23 in the wall of the bore 20, and thence to an outlet 24 adapted for connection to the engine burner or burners, the arrangement being such that the axial setting of the piston 21 will determine the area of the aperture 22 which is exposed to the groove 23. The end of piston 21 remote from the chamber 19 is subject to the pressure of fuel at the inlet 7.

To avoid static friction the tube 6 and piston 21 are arranged to be rotated about their respective axes. For this purpose the tube and piston have slidable but non-rotatable engagement with a pair of interconnected pinions 25, 26 respectively which are arranged to be driven from the engines. Moreover, the piston 21 has slidable, but non-rotatable engagement with the co-axial shaft 27 of a centrifugal pump 28, whilst on the skirt of the piston 21 are pivotally mounted a plurality of centrifugally operable weights 29, the toes of which are arranged to react on the part 30a of a collar 30 slidably surrounding the pump shaft 27. The two parts 30a, 30b of the collar are separated by an antifriction thrust bearing 31, and on the part 30b is a knife edge 32 arranged to act on a lever 33 pivotally mounted at one end on the body part 3, and arranged to bear at its other end on a flange on the sleeve 17. The arrangement is such that increase in speed will tend to move the sleeve 17 in a direction to reduce the axial width of the exposed area of the aperture 18 in the tube 6, and at the same time move the piston 21 in a direction to increase the uncovered area of the aperture 22 therein. The action of the governor weights 29 on the piston 21 is opposed by the inlet pressure of fuel less the pressure in the chamber 19, whilst their action on the sleeve 17 is opposed by a governor spring 34 acting on an abutment 35 adjustable by a speed control lever 36.

The density of the weights 29 is so chosen that they will be sensitive to, and compensate for changes in the density of the fuel. However, although it is required that the position of the piston 21 should be dependent upon the fuel density it is important that the forces opposing the governor spring 34 should be substantially unaffected by fuel density. For this purpose a pressure which is dependent upon the fuel density is applied by the centrifugal pump 28 to a diaphragm 37 arranged to act on the lever 33 in the same direction as the weights 29.

Fuel is supplied to the pump 28 through a second, but non-tapering aperture 38 in the tube 6 registering with a circumferential groove 39 in the bore 5. The groove 39 is connected through a restriction 40 to a radial pump opening, whilst an axial opening 41 to the pump rotor is in communication with the chamber 19. A point intermediate the radial opening and the restriction 40 is connected to a compartment 42 in the chamber bounded at one side by the diaphragm 37. Thus the action of the pump opposes the inlet pressure to provide a density conscious pressure which is applied to the diaphragm.

In the modification shown in FIGURE 2 wherein parts similar to parts in FIGURE 1 are referenced with the same numerals, the centrifugally operable weights 29 are of sufficient density to be substantially unaffected by variations in the fuel density and are pivotally mounted on a flanged part 43 rotatable about the longitudinal axis of tube 6 and have toes reacting on the sleeve 17 in a direction to move the latter towards the bore 5. The flanged part 43 acts through an anti-friction thrust bearing 44 on a knife edge 45 on a lever 46 pivoted at one end on the body part 3 and having a knife-edge 47 at its other end bearing through an antifriction thrust bearing 48 on the piston 21.

In this modification the density sensitive pressure derived from the pump 28 is applied to the diaphragm 37 to produce a force which acts on the lever 46 in a direction to oppose the force produced by the weights 29, the resultant force being applied to the piston 21.

By both constructions, therefore, the exposed area of the aperture 18 in the tube 6 is substantially unaffected by fuel density, whilst the exposed area of the aperture 22 in the piston 21 is in part dependent upon fuel density.

Having thus described by invention what I claim as new and desire to secure by Letters Patent is:

1. A fuel system for a gas turbine engine comprising a pump for delivering fuel to the engine, two variable orifice forming means disposed in series between the pump and the engine, two movable parts of the orifice forming means at least in part controlling the sizes of the orifices respectively, a single centrifugally operable device connected to both the movable parts and means for applying to one of the movable parts a force dependent upon fuel density.

2. A fuel system for a gas turbine engine comprising a pump for delivering fuel to the engine, two variable orifice forming means disposed in series between the pump and the engine, two movable parts of the orifice forming means, at least in part controlling the sizes of the orifices respectively, a single centrifugally operable device connected to both the movable parts, and an engine driven centrifugal pump arranged to supply fuel at a pressure dependent upon the fuel density to a hydraulic force applying member acting against one of said movable parts.

3. A fuel system as claimed in claim 1 in which the centrifugally operable device is sensitive to fuel density changes and said means for applying a force to one of the movable parts acts in the same direction as said centrifugally operable device so that movement of said movable part is independent of fuel density.

4. A fuel system as claimed in claim 1 in which the centrifugally operable device is substantially insensitive to fuel density changes and said means for applying a force to one of the movable parts acts in opposition to said centrifugally operable device so that movement of said movable part is dependent upon fuel density.

References Cited
UNITED STATES PATENTS

| | | | |
|---|---|---|---|
| 2,536,158 | 1/1951 | Chamberlin et al | 60—39.28 |
| 2,564,127 | 8/1951 | Orr | 60—39.28 |
| 2,627,906 | 2/1953 | Johnson | 158—36 |
| 2,674,847 | 4/1954 | Davies et al | 158—36.4 X |
| 2,715,831 | 8/1955 | Catford et al | 158—36 X |
| 2,874,764 | 2/1959 | Booth et al | 158—36.4 |
| 2,971,574 | 2/1961 | Kuzmitz | 158—36.4 |

FREDERICK KETTERER, *Primary Examiner.*